US006282710B1

United States Patent
Boehler (10) Patent No.: US 6,282,710 B1
(45) Date of Patent: Aug. 28, 2001

(54) APPARATUS AND METHOD FOR EXTERNALLY INITIATING AUTOMATIC EXECUTION OF MEDIA PLACED IN BASIC REMOVABLE DISC DRIVES

(75) Inventor: Paul Joseph Boehler, Arroyo Grande, CA (US)

(73) Assignee: Veritas Software Corp., Mtn. View, CA (US)

( * ) Notice: Subject to any disclaimer, the term of this patent is extended or adjusted under 35 U.S.C. 154(b) by 0 days.

(21) Appl. No.: 09/181,942

(22) Filed: Oct. 28, 1998

(51) Int. Cl.[7] .................................................. G06F 9/445

(52) U.S. Cl. ................................................. 717/11; 713/2

(58) Field of Search ............................... 717/3, 11; 713/1, 713/2, 100, 323; 709/218

(56) References Cited

U.S. PATENT DOCUMENTS

| | | | | |
|---|---|---|---|---|
| 5,239,652 | * | 8/1993 | Seibert et al. | 713/323 |
| 5,446,904 | * | 8/1995 | Belt et al. | 713/323 |
| 5,732,266 | * | 3/1998 | Moore et al. | 713/1 |
| 5,794,052 | * | 8/1998 | Harding | 717/11 |
| 5,835,759 | * | 11/1998 | Moore et al. | 713/1 |
| 6,119,153 | * | 9/2000 | Dujari et al. | 709/218 |

OTHER PUBLICATIONS

Livingston, "Have you lost your Autorun capability? Here's a simple fix", InfoWorld, Jun. 1997, pp 38.*
Mitchell, "Microsoft uses AutoPlay to woo developers", Computer Retail Week, Jan. 1995, pp 115.*
Jasco, "Multimedia in Windows 95", Computers in Libraries, Nov. 1995, pp 63.*
Livingston, "Show your users how to configure Win95 shutdown and auto–play", InfoWorld, Aug. 7, 1995, pp 29.*
Jeffrey Richter, "Q &A Win32", Microsoft Systems Journal, Sep. 1998, pp. 1–7.*

* cited by examiner

Primary Examiner—Kakali Chaki
(74) Attorney, Agent, or Firm—Carr & Ferrell, LLP (57) ABSTRACT

A computer readable memory to direct a computer to enable AutoRun functionality for basic removable disc drives. The computer readable memory stores a first, second and third set of instructions. The first set of instructions directs the computer to determine whether a removable disc has been inserted into a basic removable disc drive. The second set of instructions directs the computer to inform the operating system that the removable disc has been inserted into the basic removable disc drive, causing the operating system to execute an autorun.inf file on the removable disk without any user input. The third set of instructions directs the computer to repeat the execution of the first and second set of instructions while the computer does not seek to power down.

21 Claims, 9 Drawing Sheets

APPARATUS AND METHOD FOR EXTERNALLY INITIATING AUTOMATIC EXECUTION OF MEDIA PLACED IN BASIC REMOVABLE DISC DRIVES

FIELD OF THE INVENTION

The present invention relates to automatic execution of media placed in removable disc drives. In particular, the present invention relates to an apparatus and method for externally initiating automatic execution of media inserted into basic removable disc drives.

BACKGROUND OF THE INVENTION

Current personal computer systems support a variety of storage device drives. These drives may store information on magnetic discs, a.k.a. floppy discs, or on optical discs, such as CD-ROMs or a re-writable phase change discs (PD). Storage discs may be internal; i.e. permanently incorporated into the drive, or the discs may be removable. The drives themselves may be permanent fixtures of a particular computer system or they may be removable. As used herein, the phrase "removable disc drive" means any drive, internal or removable, that accepts removable discs.

Some CD-ROM disc drives provide an internal mechanism to automatically execute programs residing on a CD-ROM upon insertion of the CD-ROM into the CD-ROM drive. This mechanism searches the root directory of the CD-ROM to locate a file called "autorun.inf". A typical "autorun.inf" file looks like the following:

[AutoRun]

Load=ProgramName.exe

Icon=ProgramName.ico

In response to an "autorun.inf" file the CD-ROM disc drive causes the computer operating system to display the icon for ProgramName and to automatically execute ProgramName.exe.

In contrast to these CD-ROM disc drives, most removable disc drives lack an internal mechanism to automatically initiate execution of autorun.inf files, forcing computer users to take some positive action to initiate execution of programs residing on discs inserted into a removable disc drive. Hereinafter, removable disc drives lacking an internal mechanism to initiate automatic execution of programs stored on removable discs shall be referred to as basic removable disc drives.

SUMMARY OF THE INVENTION

The computer readable memory of the present invention enables a computer to initiate automatic execution of removable discs placed in basic removable disc drives. The computer readable memory stores a first, second, and third set of instructions. The first set of instructions directs a computer to determine whether a removable disc has been inserted into a basic removable disc drive. The second set of instructions directs the computer to inform the operating system that the removable disc has been inserted into the basic removable disc drive, causing the operating system to automatically execute an autorun.inf file on the removable disk without any user input. The third set of instructions directs the computer to repeat the execution of the first and second set of instructions while the computer does not seek to power down.

Because the AutoRun functionality of the present invention is realized via software, the present invention avoids both hardware changes to basic removable disc drives and changes to existing operating systems. Users of the present invention need not replace any of their existing system hardware or software to obtain the AutoRun functionality of the present invention. Other objects, features, and advantages of the present invention will be apparent from the accompanying drawings and detailed description that follows.

BRIEF DESCRIPTION OF THE DRAWINGS

The present invention is illustrated by way of example and not by way of limitation in the figures of the accompanying drawings. In the accompanying drawings similar references indicate similar elements.

DETAILED DESCRIPTION OF THE PREFERRED EMBODIMENTS

A. Introduction

Figure 1:
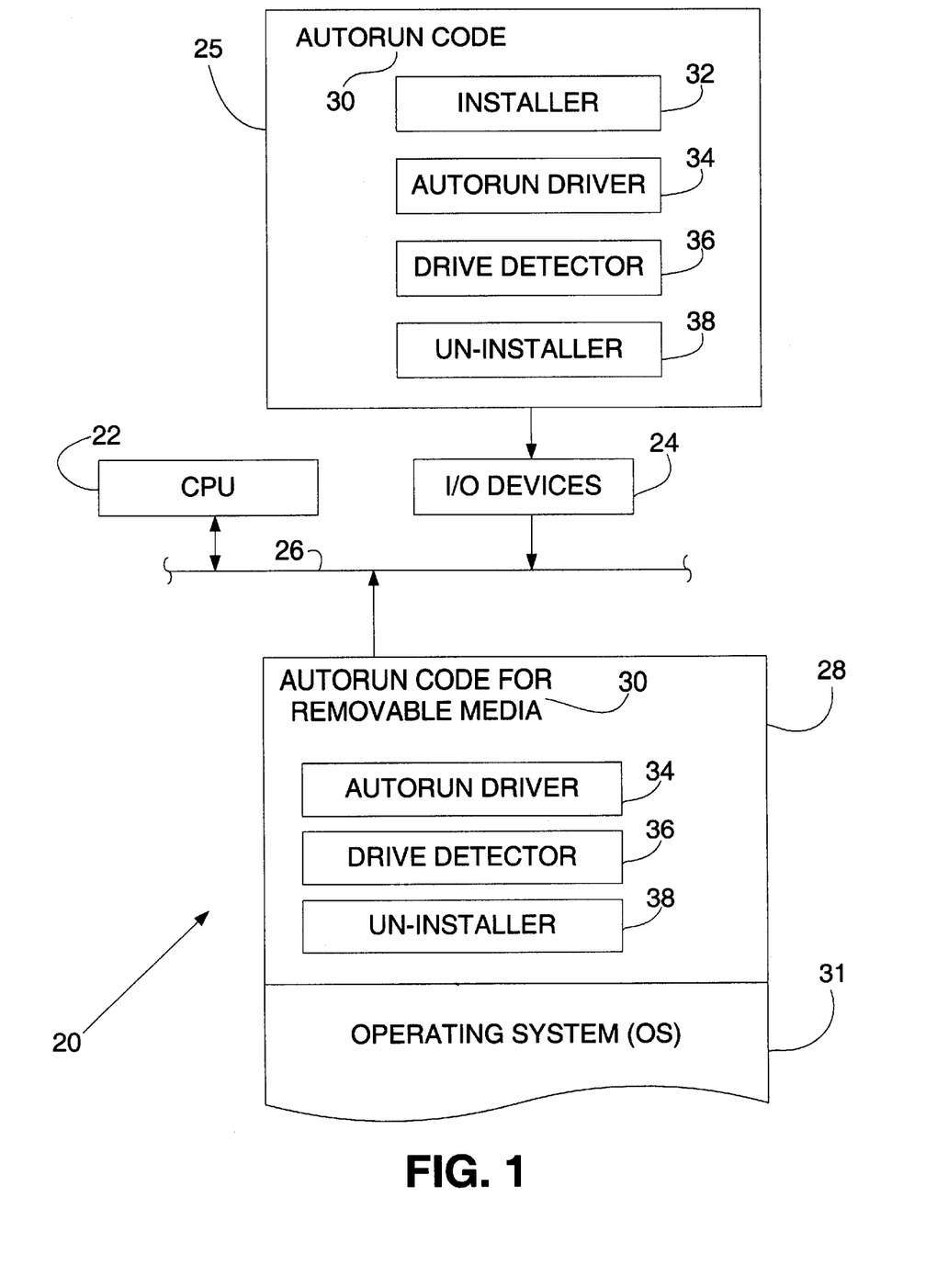
FIG. 1 illustrates a computer system according to the present invention.

FIG. 1 illustrates in block diagram form computer 20 constructed in accordance with an embodiment of the invention. As will be described in more detail below, the AutoRun Code 30 of the present invention alters the operation of computer 20 enabling it to automatically execute an autorun.inf file stored on a removable disc in response to the disc's insertion into a basic removable disc drive. Because the present invention implements AutoRun functionality via software, basic removable disc drives; i.e. those lacking an internal AutoRun functionality, may be easily and inexpensively retrofitted without any hardware changes or changes to operating system (OS) 31.

Prior to a more detailed discussion of AutoRun Code 30, consider computer 20. Computer 20 includes a Central Processing Unit (CPU) 22 that communicates with memory 28 over a system bus 26. CPU 22 determines and takes the appropriate action in response to each user command and internal state by executing instructions stored electronically in memory 28, including the instructions of operating system (OS) 31 and AutoRun Code 30. CPU 22 also communicates with a set of input/output (I/O) devices 24 over system bus 26. (I/O) devices 24 include a keyboard, mouse, video monitor, and printer (not illustrated). (I/O) devices 24 include embedded disc drives and removable disc drives. These drives may read optical or magnetic discs. The interactions between CPU 22,(I/O) devices 24, system bus 26, and memory 28 are known in the art. The present invention is directed toward the execution of AutoRun Code 30 in connection with these elements.

B. Overview of AutoRun Code

As shown in FIG. 1, AutoRun Code 30 includes four modules: Installer 32, AutoRun Driver 34, Drive Detector 36 and Un-Installer 38. Installer 32 dynamically loads AutoRun Driver 34, Drive Detector 36 and Un-Installer 38 into memory 28 from their initial memory location 25 outside computer 20. AutoRun Driver 34 forces OS 31 to process an autorun.inf file residing on a removable disc upon detecting the presence of the removable disc within a basic removable disc drive. AutoRun Driver 34 uses Drive Detector 36 to identify removable disc drives associated with computer 20. Given this knowledge, AutoRun Driver 34 polls the identified removable disc drives to determine whether a removable disc has recently been inserted into one of them, and if so, initiates automatic processing of an autorun.inf file on the removable disc, if one exists. At the computer user's command, Un-Installer 38 removes the AutoRun functionality from computer 20 by reversing the changes to computer 20 made by Installer 32.

Figure 2:
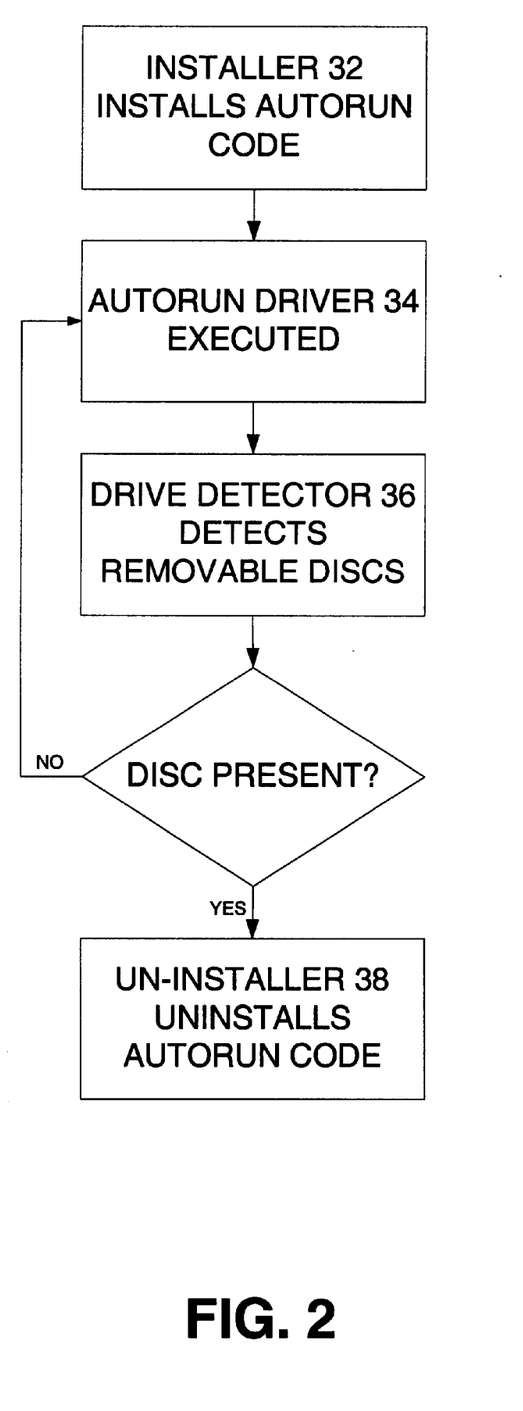
FIG. 2 illustrates the inter-relationship of the software modules of the present invention.

FIG. 2 illustrates explicitly the relationship between modules 32, 34, 36 and 38 discussed above. Implementation of the AutoRun feature begins with installation into memory 28 of AutoRun Code modules 34, 36, and 38 by Installer 32. Installer 32 runs just once on computer 20 and its execution is initiated by the computer user. After installation, automatic execution of AutoRun Driver 34 begins. AutoRun Driver 34 and Drive Detector 36 continue running until the computer user decides to disable the AutoRun feature by launching Un-Installer 38.

C. The Installer

Figure 3:
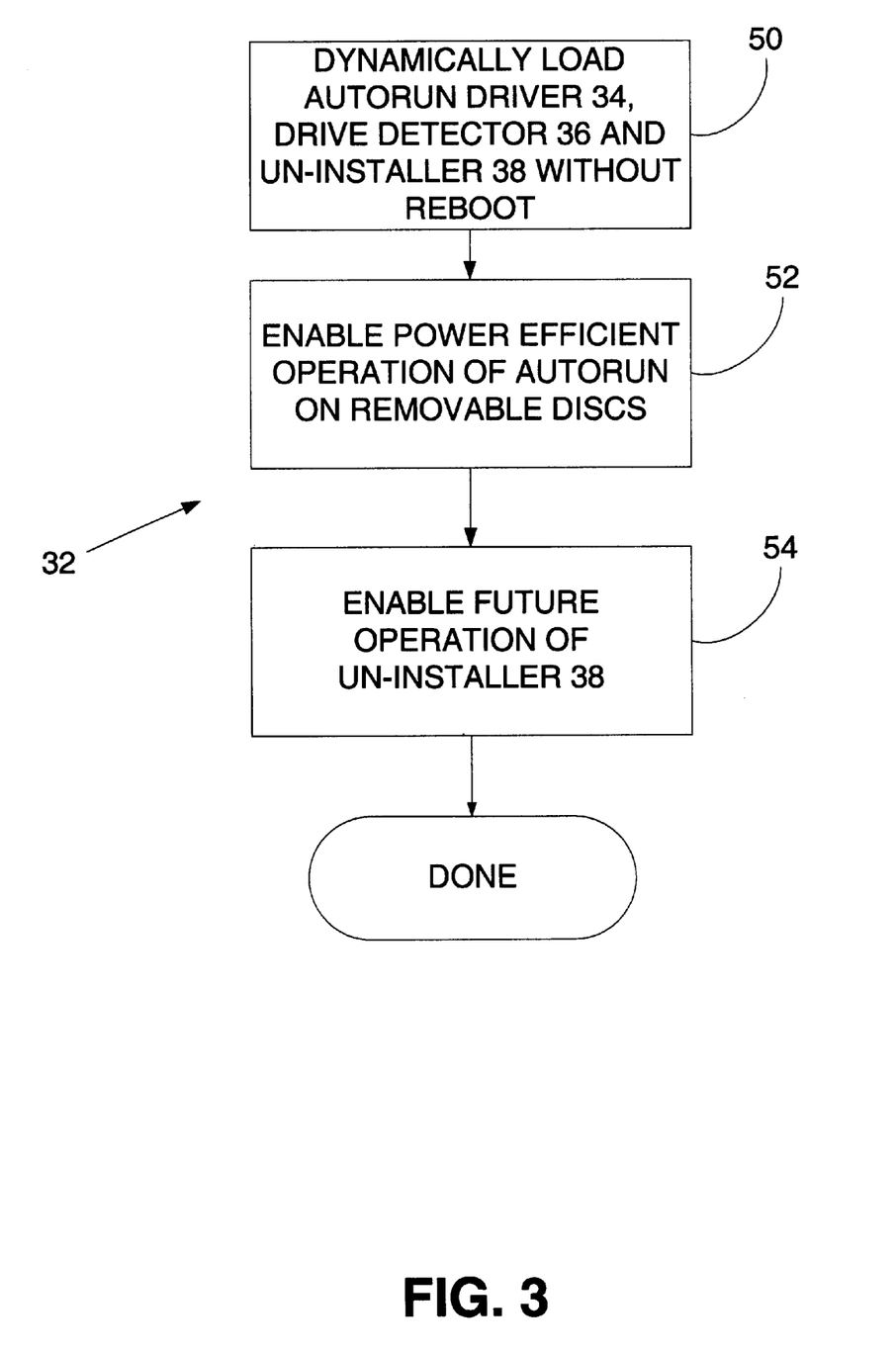
FIG. 3 illustrates the instructions of the Installer module.

FIG. 3 illustrates in flow diagram form instructions for Installer 32. Installer 32, as well as all other AutoRun Code modules discussed herein, may be realized in any computer language, including C++.

Execution of Installer 32 begins in response to a user's command to install AutoRun Code 30. The method used to launch Installer 32 varies depending upon the approach used to distribute AutoRun Code 30. According to one conventional distribution approach, AutoRun Code 30 is placed on a removable disc. To facilitate its easy discovery and execution, Installer 32 is placed in the root directory of the removable disc. Another popular distribution approach is posting AutoRun code 30 on a website. Site visitors interested in acquiring AutoRun capability can launch Installer 32 from the site. Regardless of the distribution approach used, Installer 32 need not copy itself into memory 28 because Installer 32 needs to be run only once on computer 20 to add AutoRun functionality for basic removable disc drives associated with computer 20.

Briefly described, Installer 32 performs three tasks. First, during step 50, Installer 32 dynamically loads into memory 28 AutoRun Driver 34, Drive Detector 36 and Un-Installer 38. Second, during step 52 Installer 32 enables power efficient operation of AutoRun. Finally, during step 54 Installer 32 enables future operation of Un-Installer 38.

Figure 4:
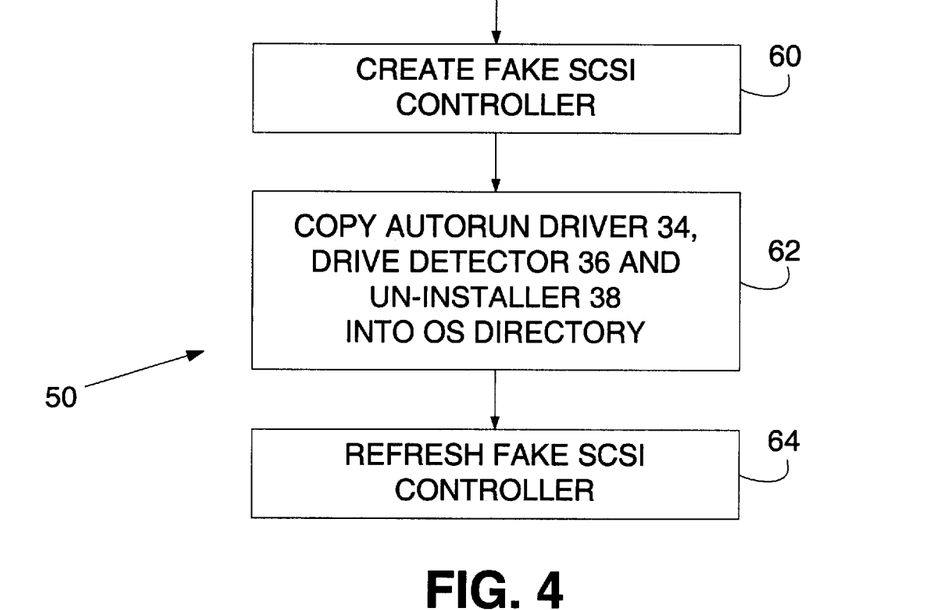
FIG. 4 illustrates instructions for dynamically loading AutoRun software modules.

Given that brief description of Installer 32, consider now FIG. 4, which illustrates in flow diagram form instructions 50 for dynamically loading AutoRun Driver 34, Drive Detector 36 and Un-Installer 38 into memory 28 without re-booting computer 20. Within the Windows™ OS 31 no documented way exists to dynamically load device drivers, such as AutoRun Driver 34, into the appropriate block device chains without rebooting. However, analysis reveals that the Windows™ OS dynamically loads device drivers when a SCSI controller exists and is refreshed. For this reason, Installer 32 creates a "fake" or temporary SCSI controller during step 60. Subsequently, during step 62 Installer 32 copies AutoRun Driver 34, Drive Detector 36 and Un-Installer 38 into the computer's I/O subsystem directory. In the Windows™ OS 31, Installer 32 places modules 34, 36, and 38 into the directory named: windows\system\iosubsys. Preparations complete, Installer 32 accomplishes the dynamic loading of modules 34, 36 and 38 during step 64 by refreshing the fake SCSI controller created during step 60.

Figure 5:
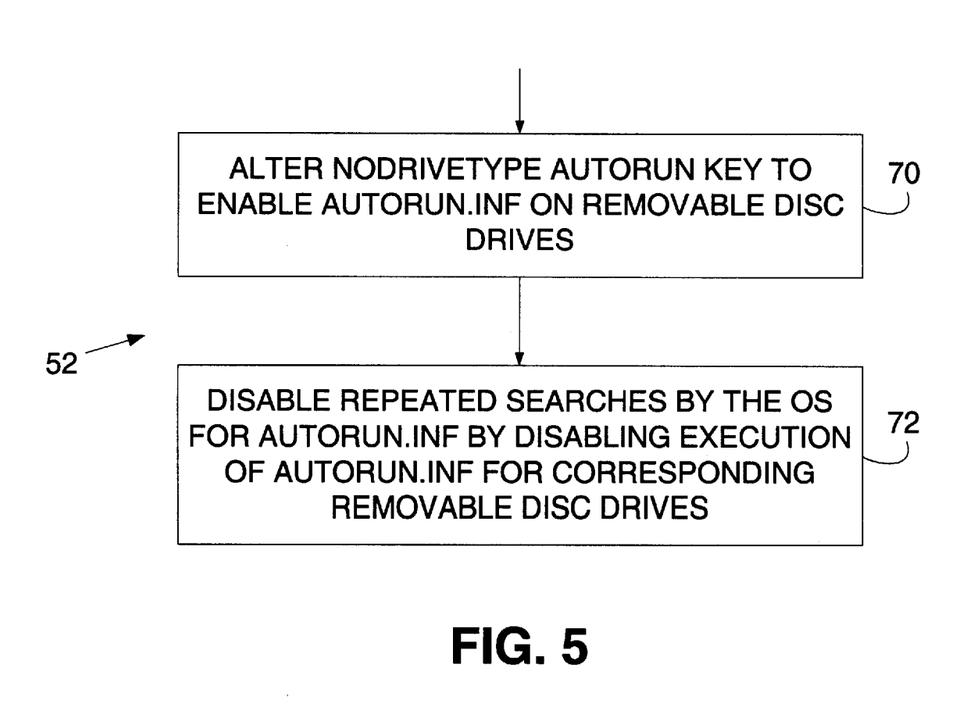
FIG. 5 illustrates instructions for enabling power efficient operation of the AutoRun code.

FIG. 5 illustrates in flow diagram form instructions 52 used by Installer 32 to enable power efficient operation of the AutoRun feature. During step 70 Installer 32 first enables OS 31 to perform AutoRun on removable discs. Without this step, OS 31 cannot process an autorun.inf file on a removable disc. The Windows™ OS does not document any means for enabling AutoRun for removable disc drives; however, research revealed a relevant registry key named: Software\Microsoft\Window\CurrentVersion\Policies\Explorer. For convenience, refer to this registry key as the Explorer key. The Explorer key includes two special keys: NoDriveTypeAutoRun and NoDriveAutoRun. The first key, NoDriveTypeAutoRun, defines what types of drives should process autorun.inf files. During step 70 Installer 32 sets to 0 bit 3 of the NoDriveTypeAutoRun key to enable OS 31 to process autorun.inf files residing on removable discs inserted into removable disc drives.

Enabling the processing of autorun.inf files residing on removable discs can noticeably slow OS operation. This delay arises from repeated pauses by OS 31 to look for an autorun.inf file on a disc in basic removable magnetic disc drive, which is empty typically. To avoid these delays, Installer 32 uses the second Explorer key: NoDriveAutoRun. This second Explorer key uses a bit for each drive to individually enable/disable the AutoRun feature. Thus, during step 72, for each removable magnetic disc drive, Installer 32 sets the appropriate bit of the NoDriveAutoRun key to disable the AutoRun feature.

Although the AutoRun feature is disabled, as will be discussed shortly, AutoRun Driver 34 assumes the responsibility of detecting removable discs in removable disc drives and does so in a manner that has less impact on OS operation.

Figure 6:
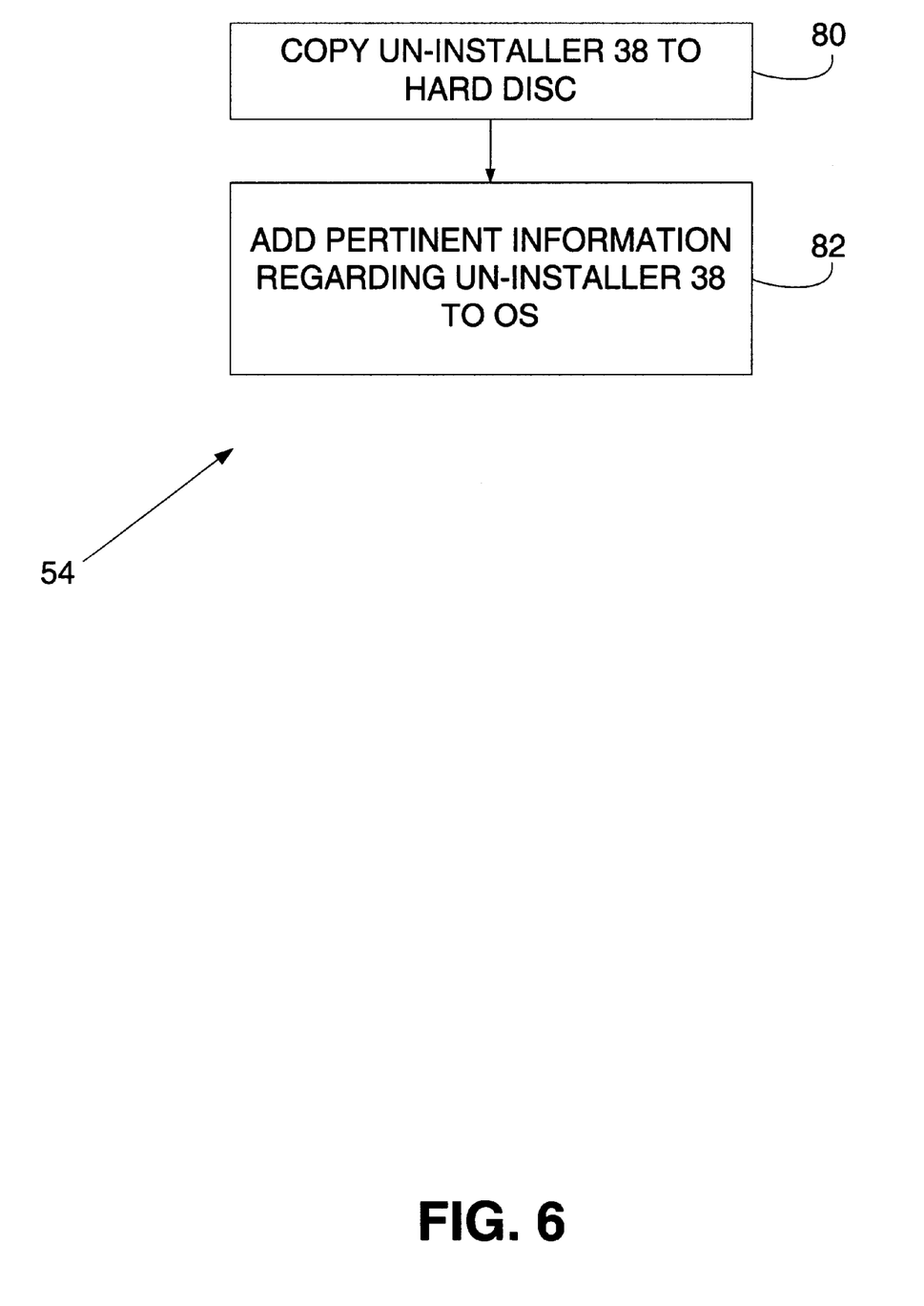
FIG. 6 illustrates the instructions for enabling future operation of the Un-Installer module.

FIG. 6 illustrates in flow diagram form instructions 54, which enable future operation of Un-Installer 38. Installer 32 performs two tasks to enable operation of Un-Installer 38. First, during step 80 Installer 32 copies Un-Installer 38 from its initial memory location 25 onto a hard drive of computer 20. Second, during step 82 Installer 32 adds to OS 31 pertinent information about Un-Installer 38. For the Windows™ OS this includes adding information to the registry such that Un-Installer 38 exists in the Windows™ Add/Remove Programs facility.

D. The AutoRun Driver

Figure 7:
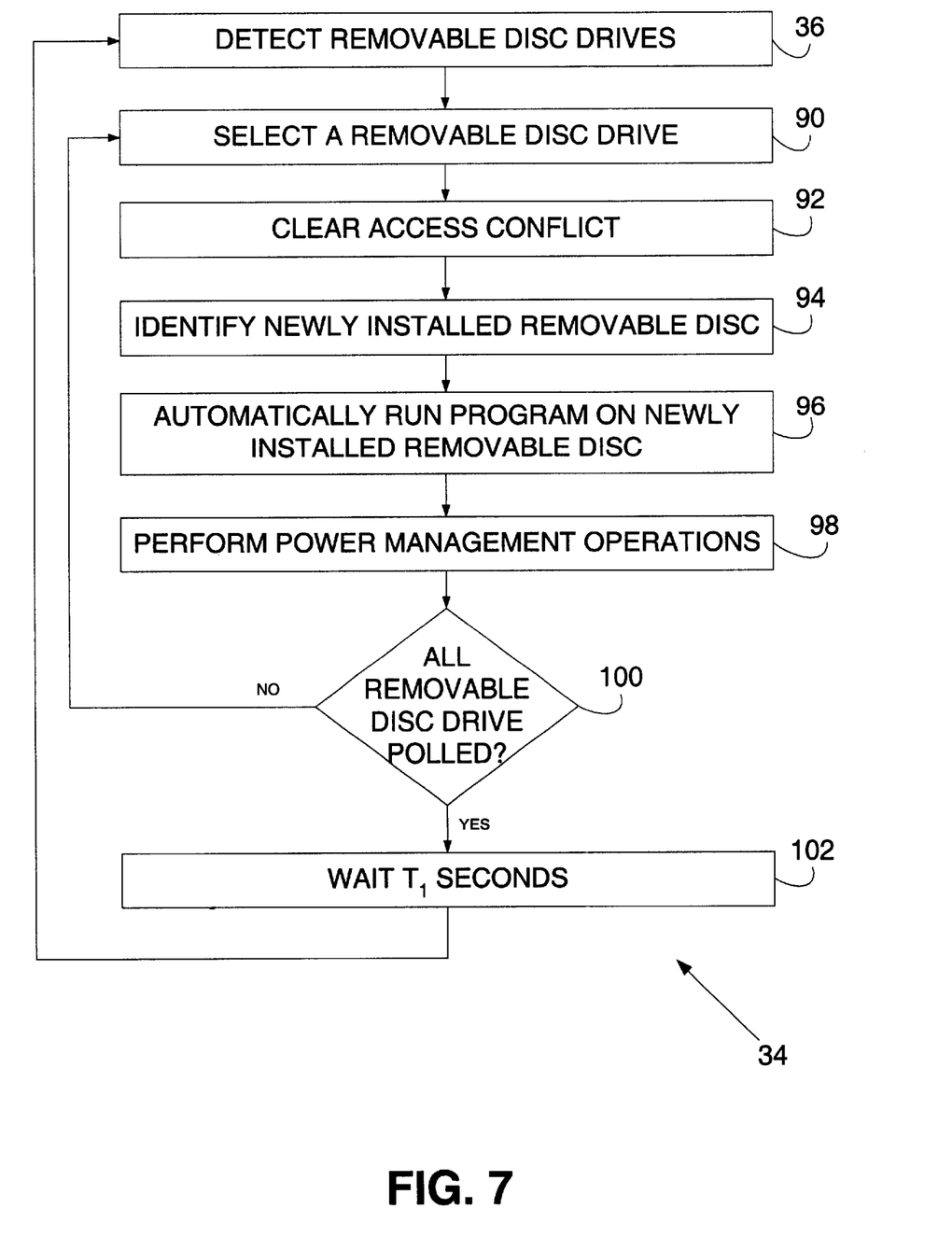
FIG. 7 illustrates the instructions of the AutoRun Driver module.

FIG. 7 illustrates in flow diagram form the instructions of AutoRun Driver 34. AutoRun Driver 34 determines when a removable disc has been inserted into a removable disc drive and in response initiates automatic processing of an autorun.inf file residing on that removable disc.

AutoRun Driver 34 begins by identifying the removable disc drives currently associated with computer 20 during step 36. How Drive Detector 36 performs this function will be discussed in detail later with respect to FIG. 9.

Armed with the information from Drive Detector 36, AutoRun Driver 34 begins the process of polling the identified removable disc drives. During step 90, AutoRun Driver 34 selects for examination one of the identified removable disc drives. Before attempting to poll the selected removable disc drive, AutoRun Driver 34 first clears any access conflict between itself and OS 31 during step 92. How AutoRun Driver 34 clears these conflicts will be discussed in detail later with respect to FIG. 8.

During step 94 AutoRun Driver 34 accesses the selected drive and determines whether a removable disc has recently been inserted into the drive. For the Windows™ OS a number of polling commands are available; however, the polling command chosen should be compatible with the wide range of disc drives that OS 31 can accommodate. Furthermore, preferably, the results of the polling command should be visible to and compatible with the other device drivers associated with computer 20. Failure to meet this requirement could lead to data loss. While the TEST UNIT READY pass through command may seem to be the logical choice for the polling command during step 94, this pass-through command is not compatible with certain integrated drive electronics (IDE) disc drives. Analysis revealed that the IOR_MEDIA_CHECK_RESET command met the desired performance criteria for the polling command. Lower level device drivers translate this command into an appropriate lower level command. Thus, for the Windows™ OS, AutoRun Driver 34 uses the IOR_MEDIA_CHECK_RESET command during step 94 to poll the selected removable disc drive.

AutoRun Driver 34 addresses one additional concern during step 94: making the polling command visible to other drivers, such a disc caches. To ensure that all drivers accessing the selected removable disc drive will have an opportunity to study the results of the polling command, AutoRun Driver 34 sends the polling command through the disc's driver stack using the IOS_SendCommand, rather than communicating directly with the selected disc drive. As a result of these actions during step 94, AutoRun Driver 34 and all other drivers will be informed of the drive's response to the polling command.

If a removable disc has been inserted recently into the selected removable disc drive, then during step 96 AutoRun Driver 34 forces OS 31 to process an autorun.inf file on the removable disc, if one exists. AutoRun Driver 34 does so for Windows™ OS 31 by issuing the command ISP_DEVICE_ARRIVED.

During step 98 AutoRun Driver 34 turns its attention to power management concerns. Polling of disc drives by AutoRun Driver 34 may lead OS 31 to believe there is on-going system activity and to delay system power down. To prevent this, AutoRun Driver 34 discontinues polling removable disc drives when it determines that OS 31 wishes to power down. Examples of system events that causes AutoRun Driver to cease polling are: system critical shut-down, un-configuration of a device, system shut-down and un-initialization of a device or driver. In response to any of the following messages from Windows™ OS 31 AutoRun Driver ceases polling: AEP_SYSTEM_CRIT_SHUTDOWN, AEP_UNCONFIG_DCB, AEP_SYSTEM_SHUTDOWN and AEP_UNNTIALIZE. Upon detection of any of these events, AutoRun Driver 34 ceases execution until after computer 20 is powered up again. On the other hand, in the absence of any detected desire by OS 31 to power-down, AutoRun Driver 34 branches to step 100 from step 98.

AutoRun Driver 34 determines during step 100 whether it has polled all removable disc drives it last detected. If not, AutoRun Driver 34 branches back to step 90 and polls a remaining removable disc drive. On the other hand, if all removable disc drives last detected have been polled, then AutoRun Driver 34 advances to step 102. AutoRun Driver 34 pauses there for a few seconds prior to resume polling of removable disc drives. This pause reduces the impact of AutoRun Driver 34 on system operation. The exact amount of time chosen for this pause is a design choice. In one embodiment, AutoRun Driver 34 pauses 4 seconds before returning to step 36.

D.1. Clearing Access Conflicts

Figure 8:
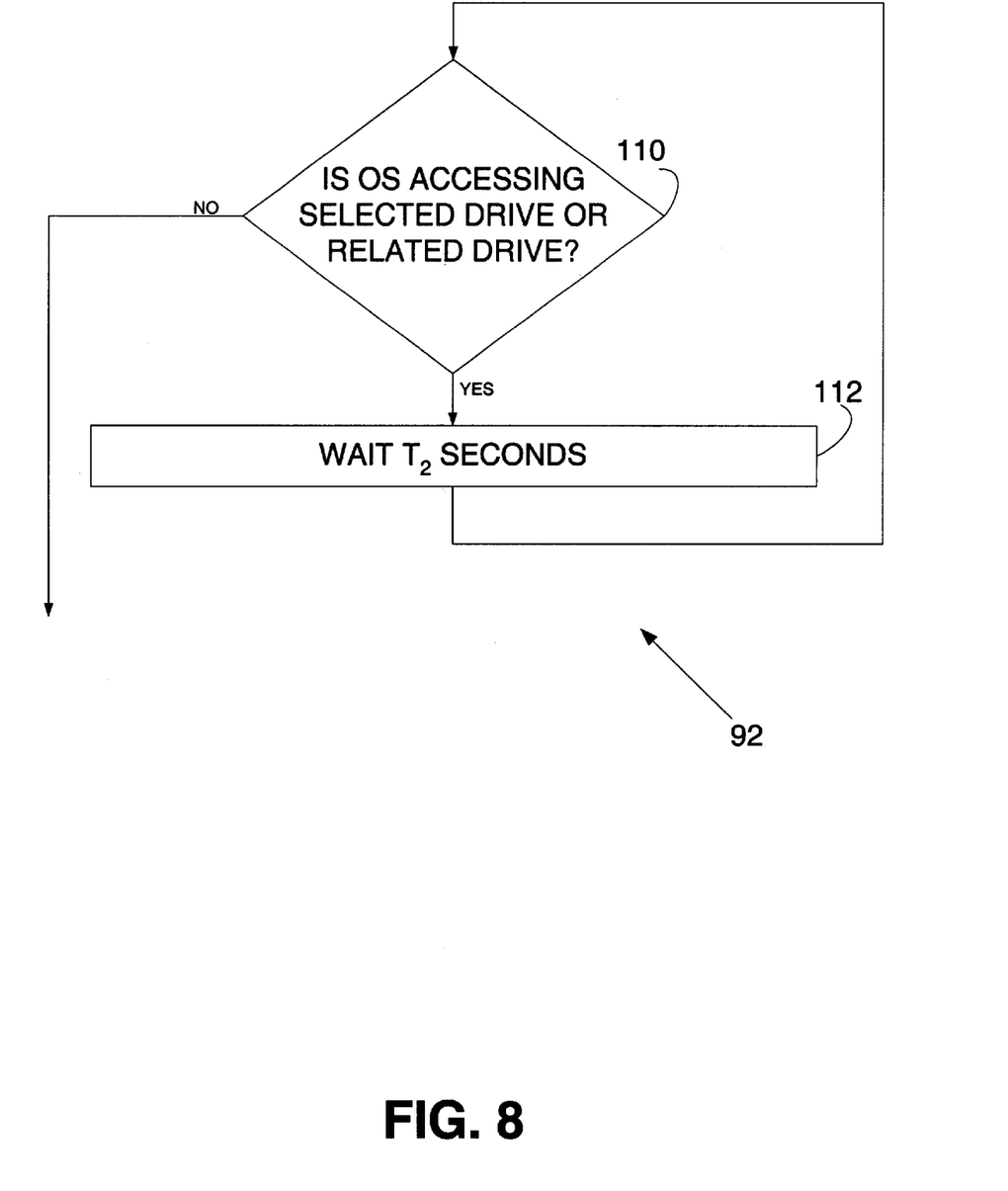
FIG. 8 illustrates the instructions for resolving access conflicts.

FIG. 8 illustrates in flow diagram form instructions 92 used by AutoRun Driver 34 to clear disc drive access conflicts. Instructions 92 help insure that the periodic polling of removable disc drives does not degrade their performance. Polling can degrade disc drive performance in two ways. First, increased command traffic can slow disc drive performance and, second, some removable disc drives lose the contents of their internal buffers if polled too quickly after a device change.

Instructions 92 minimize these impacts by determining whether OS 31 is accessing the selected drive or a related drive during step 110. In the Windows OS 31, Instructions 92 determine whether a disc drive is being accessed by examining the drive's driver stack. Concerns regarding multiple logical unit drives (hereinafter referred to as multiple LUNs) also cause Instructions 92 to examine the driver stack of related drives during step 92, when necessary. Multiple LUNs are drives that support multiple types of discs. For example, the phase change drives (PD) accept both standard CD-ROM discs or re-writable optical discs. Multiple LUN drives present themselves to OS 31 as two disc drives. Accessing one of the drives of a multiple LUN drive while the other is being accessed by OS 31 can lead to undesirable race conditions within the multiple LUN. For this reason, if one drive of a multiple LUN is being accessed by OS 31, Instructions 92 will not access the other related drive.

If it is discovered that the selected drive or a related drive are being accessed by OS 31, then AutoRun Driver 34 pauses for a few seconds during step 112. As before, the exact amount of delay is a design choice. After this pause, AutoRun Driver 34 returns to step 110 to determine whether the access conflict has been resolved. AutoRun Driver 34 continues to wait to poll the selected drive until the access conflict resolves itself.

E. The Drive Detector

Figure 9:
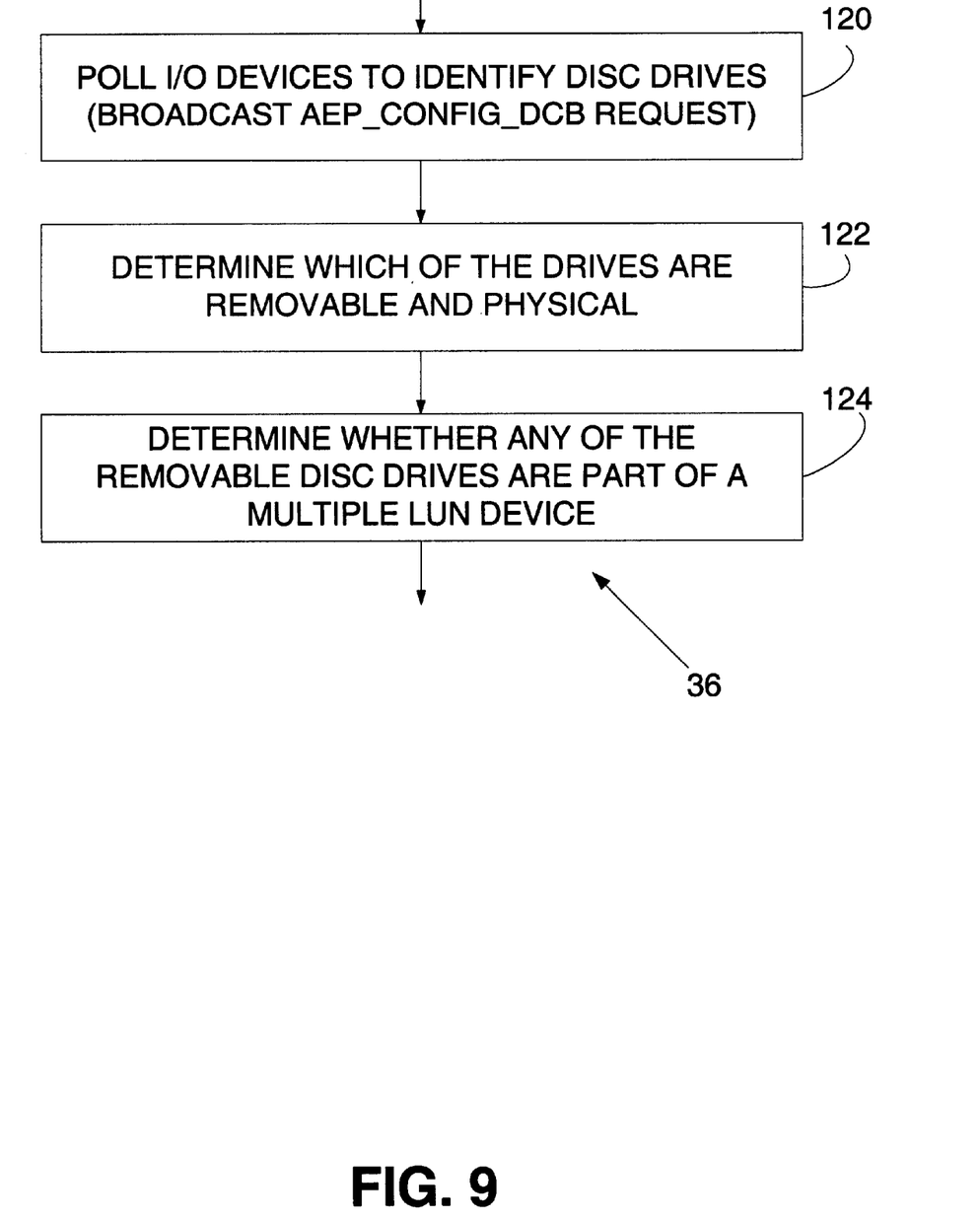
FIG. 9 illustrates the instructions of the Drive Detector module.

FIG. 9 illustrates in flow diagram form the instructions of Drive Detector 36. Drive Detector 36 detects which drives associated with computer 20 accept removable discs and are physical drives and of these which is associated with a multiple LUN. Drive Detector 36 begins in step 120 by broadcasting a configuration check command to IO devices 24. In the Windows™ OS, Drive Detector 36 uses the message: AEP_CONFIG_DCB. Each IO device 24 responds by identifying its type. During step 122 Drive Detector 31 examines the type of each IO device 24 to identify which devices are physical and accept removable discs. Drive Detector 34 considers physical all direct access drives and optical drives. In the Windows™ OS, these drives are designated by device types: 0x00, 0x07 and 0x84. Devices of type 0x00 may or may not be removable, therefore during step 122 Drive Detector 36 also examines the device flags passed with the AEP_CONFIG_DCB message to determine whether devices of this type are removable and physical.

During step 124 Drive Detector 36 identifies which drives are part of multiple LUNs. For the Windows™ OS, Drive Detector 36 does so by examining the flags associated with the AEP_CONFIG_DCB message for the DCB_scsi_lun. (Note both IDE and SCSI drives may be multiple LUNs.) AutoRun Driver 34 will later use this information to identify possible access conflicts with OS 31.

F. The Un-Installer

Figure 10:
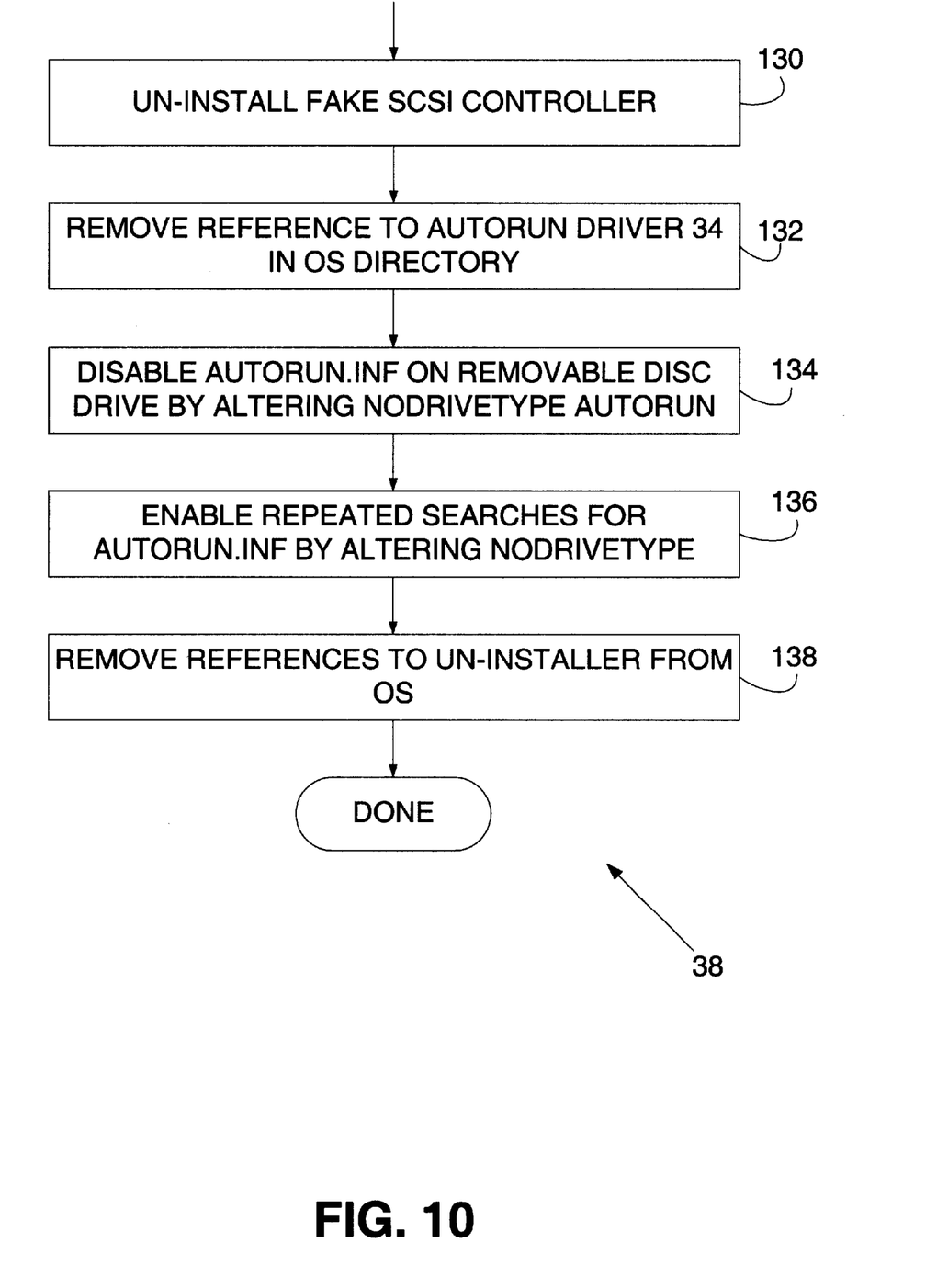
FIG. 10 illustrates the instruction of the Un-Installer module.

FIG. 10 illustrates in flow diagram form the instructions of Un-Installer 38. Un-Installer 38 removes AutoRun functionality from computer 20 by reversing the steps taken by Installer 32. During step 130 Un-Installer 38 eliminates the fake SCSI controller created by Installer 32. Subsequently, during step 132, Un-Installer 38 removes the reference to AutoRun Driver 34 in the OS directory. Next, Un-Installer 38 disables the ability of OS 31 to process autorun.inf files by returning the two keys of the Explorer key to their appropriate values during steps 134 and 136. Finally, during step 138, Un-Installer 38 removes references to itself in the programs facility. In the Windows™ OS this facility is named Add/Remove Programs.

G. Conclusion

Thus, an apparatus and method for adding AutoRun functionality to a computer including basic removable disc drives that does not require any hardware changes has been described.

In the foregoing specification, the invention has been described with reference to specific exemplary embodiments thereof. It will, however, be evident that various modifications and changes may be made thereto without departing from the broader spirit and scope of the invention as set forth in the appended claims. Accordingly, the specification and drawings are to be regarded in an illustrative rather than a restrictive sense.

What is claimed is:

1. A computer readable memory to direct a computer to function in a specified manner, comprising:
    a first set of instructions to identify an install state when a removable disc has been inserted into a basic removable disc drive of the computer; and
    a second set of instructions to initiate automatic execution by the computer of a program stored on the removable disc without any input from a user of the computer.

2. The computer readable memory of claim 1 further comprising:
    a third set of instructions to repeat the execution of the first and second set of instructions while the computer does not seek to power down.

3. The computer readable memory of claim 1 further comprising:
    a fourth set of instructions to resolve basic removable disc drive access conflicts.

4. The computer readable memory of claim 1 further comprising:
    a fifth set of instructions to dynamically load the first and second set of instructions into the computer without powering down the computer.

5. The computer readable memory of claim 4 wherein the fifth set of instructions include:
    a first subset of instructions to enable power efficient operation of the computer while executing the first and second set of instructions.

6. The computer readable memory of claim 1 wherein the removable disc is a magnetic disc.

7. The computer readable memory of claim 1 wherein the removable disc is a re-writable optical disc.

8. A computer readable memory to direct a computer to function in a specified manner, comprising:
    a first set of instructions to determine whether a removable disc has been inserted into a basic removable disc drive of the computer,
    a second set of instructions to inform an operating system of the computer that the removable disc has been inserted into the basic removable disc drive and to cause the operating system to execute an autorun.inf file on the removable disk without any user input; and
    a third set of instructions to repeat the execution of the first and second set of instructions while the computer does not seek to power down.

9. The computer readable memory of claim 8 further comprising:
    a fourth set of instructions to dynamically load the first, second and third set of instructions into the computer without powering down the computer.

10. The computer readable memory of claim 9 wherein the fourth set of instructions further comprise:
    a fifth set of instructions to enable power efficient operation of the computer while executing the first, second and third set of instructions.

11. A The computer readable memory to direct a computer to function in a specified manner, comprising:
    a first set of instructions to determine whether a removable disc has been inserted into a basic removable disc drive of the computer;
    a second set of instructions to inform an operating system of the computer that the removable disc has been inserted into the basic removable disc drive and to cause the operating system to execute an autorun.inf file on the removable disc without any user input;
    a third set of instructions to repeat the execution of the first and second set of instructions while the computer does not seek to power down; and
    a fourth set of instructions to dynamically load the first, second and third set of instructions into the computer without powering down the computer, wherein the fourth set of instructions include a fifth set of instructions to enable power efficient operation of the computer while executing the first, second and third set of instructions, a sixth set of instructions to create a SCSI controllers, a seventh set of instructions to copy the first, second and third set of instructions into a memory of the computer, and an eighth set of instructions to refresh the SCSI controller thereby loading the first, second and third set of instructions into the computer without rebooting the computer.

12. The computer readable memory of claim 11 further comprising:
    a ninth set of instructions to resolve access conflicts for removable disc drives.

13. The computer readable memory of claim 12 further comprising:
    a tenth set of instructions to detect removable disc drives associated with the computer.

14. The computer readable memory of claim 13 wherein the tenth set of instructions comprise:
    an eleventh set of instructions to broadcast a configuration request to peripheral devices of the computer;

a twelfth set of instructions to determine whether any of the peripheral devices is a disc drive; and a thirteenth set of instructions to determine whether those disc drives are physical and removable.

15. A method of transferring data over a network, the method comprising the steps of transmitting from a first computer on the network to a second computer on the network a set of electronic signals defining one or more modules to implement an AutoRun feature to be performed on the second computer, the one or more modules including:

a first set of instructions to determine whether a removable disc has been inserted into a basic removable disc drive of the second computer;

a second set of instructions to inform an operating system of the second computer that the removable disc has been inserted into the basic removable disc drive and to cause the operating system to execute an autorun.inf file on the removable disk without any user input; and a third set of instructions to repeat the execution of the first and second set of instructions while the second computer does not seek to power down.

16. The method of claim 15 wherein the one or more modules further including:

a fourth set of instructions to dynamically load the first, second and third set of instructions into the second computer without powering down the second computer.

17. The method of claim 16 wherein the fourth set of instructions further comprise:

a fifth set of instructions to enable power efficient operation of the computer while executing the first, second and third set of instructions.

18. A method of transferring data over a network, the method comprising the steps of transmitting from a first computer on the network to a second computer on the network a set of electronic signals defining one or more modules to implement an AutoRun feature to be performed on the second computer, the one or more modules including:

a first set of instructions to determine whether a removable disc has been inserted into a basic removable disc drive of the second computer;

a second set of instructions to inform an operating system of the second computer that the removable disc has been inserted into the basic removable disc drive and to cause the operating system to execute an autorun.inf file on the removable disc without any user input;

a third set of instructions to repeat the execution of the first and second set of instructions while the second computer does not seek to power down; and a fourth set of instructions to dynamically load the first, second and third set of instructions into the second computer without powering down the second computer, wherein the fourth set of instructions further include a fifth set of instructions to enable power efficient operation of the computer while executing the first, second and third set of instructions, a sixth set of instructions to create a SCSI controller, a seventh set of instructions to copy the first, second and third set of instructions into the computer, and an eighth set of instructions to refresh the SCSI controller thereby loading the first, second and third set of instructions into the second computer without rebooting the second computer.

19. The method of claim 18 wherein the one or more modules further include:

a ninth set of instructions to resolve access conflicts for basic removable disc drives.

20. The method of claim 19 wherein the one or more modules further include:

a tenth set of instructions to detect basic removable disc drives associated with the computer.

21. The method of claim 20 wherein the tenth set of instructions comprise:

an eleventh set of instructions to broadcast a configuration request to peripheral devices of the second computer;

a twelfth set of instructions to determine whether any of the peripheral devices is a disc drive; and a thirteenth set of instructions to determine whether those disc drives are physical and accept removable discs.

* * * * *